United States Patent Office 2,820,043
Patented Jan. 14, 1958

2,820,043

PREPARATION OF IMIDAZOLINE PROPIONIC ACID DERIVATIVES

James L. Rainey, Abington, and William G. Rinear, Philadelphia, Pa., assignors to Rohm & Haas Company, Philadelphia, Pa., a corporation of Delaware No Drawing. Application October 26, 1954
Serial No. 464,903

6 Claims. (Cl. 260—309.6)

This invention relates to 2-hydrocarbon-substituted imidazoline-1-propionic acids and salts thereof formed with either acids or bases. These substances are valuable surface-active materials which are amphoteric in nature and find use as wetting, penetrating, emulsifying, dispersing, and cleansing agents. They are compatible with quaternary ammonium salts and at proper ratios improve the bactericidal action thereof. They may be used over a wide range of pH from very acidic to strongly basic. They may be mixed with alkaline builders and/or anion-active soaps and detergents. They thus find use in metal pickling and cleaning, detergent-sanitizers, detergent bars, powders, pastes, and solutions, laundering agents, shampoos, textile processing aids, and the like.

The peculiar balance of the basic imidazolinyl group and of the carboxyl group impart to the compounds of this invention rather unique properties, which are scarcely evident in N-alkylaminopropionates of the art or the sulfonated substituted imidazolines.

The compounds of this invention are prepared by reacting a 2-hydrocarbon-substituted imidazoline of the structure

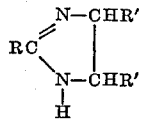

where R is a hydrocarbon group, particularly an aliphatic hydrocarbon group of 9 to about 17 or more carbon atoms and R' is hydrogen or the methyl group, with a lower alkyl acrylate by heating a mixture thereof, whereby a lower alkyl ester of a 2-substituted imidazoline-propionic acid is formed, and hydrolyzing said ester.

The mixture of lower alkyl acrylate and a said imidazoline is conveniently heated between 75° and 150° C. Any excess of alkyl acrylate is distilled off. These operations may be carried out at normal, reduced, or increased pressures. The product formed is an ester of the structure

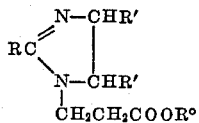

where R° is a lower alkyl group from methyl to butyl.

The ester is hydrolyzed or saponified by heating it, usually between 70° and 130° C. and desirably under reflux, with aqueous acid or alkali. The alcohol residue is split off and the liberated alcohol may be taken off, as may also water and any solvent used to assist in this reaction. There may then be obtained as a product a salt of the 2-substituted imidazolinepropionic acid or this acid itself. The salt may be a carboxylate, as of an alkali metal, or it may be in the form of the amine salt formed with an acid, particularly an inorganic acid, wherein the acid is held by the amine portion of the imidazoline ring.

For saponifying the intermediate ester there may be used conveniently sodium hydroxide or potassium hydroxide or a strongly basic quaternary ammonium hydroxide, such as dimethyldibenzylammonium hydroxide or trimethylbenzylammonium hydroxide. An aqueous hydroxide solution is usually heated with the ester under reflux or at other temperatures between 70° and 130° C., using pressure, if desired. The saponifying solutions are generally used at 5% to 50% of metal hydroxide or quaternary hydroxide. The water may be supplemented with a water-miscible alkanol as an additional solvent. For hydrolysis there may be used an aqueous strong acid, such as sulfuric acid, hydrochloric, or even phosphoric acid.

As alternate procedures for preparing the products of this invention acrylonitrile may be used in the place of an alkyl acrylate and the resulting cyanoethylimidazoline then reacted with aqueous alkali to convert the nitrile group to carboxyethyl.

Again, the 2-hydrocarbon imidazoline may be reacted with β-propiolactone to yield the acid form of product. The reaction is preferably effected between 100° and 175° C.

Various 2-alkyl imidazolines are known. They are prepared by heating a 1,2-diamine such as ethylenediamine, propylenediamine, or 2,3-butylenediamine, with a long-chained carboxylic acid, here particularly a fatty acid, a fatty acyl halide, or fatty acid ester. There may also be used an alkylbenzoic acid, its ester or acid halide, such as octylbenzoic, nonylbenzoic, or dodecylbenzoic acids. A few typical preparations will be presented to illustrate the preparation of these starting materials.

PREPARATION A

To a reaction vessel equipped with stirrer, reflux condenser attached to a trap, and charging tube there are added 200 parts by weight of lauric acid, 119 parts of 77% ethylenediamine, 106 parts of concentrated hydrochloric acid (35%), and 120 parts of toluene. This mixture is heated to 121° C. over three hours while 95 parts of water are removed through the trap. The temperature of the mixture is then increased, the toluene being distilled off and the residue carried to 289° C. in two hours. The reaction mixture is cooled to 100° C. and treated with 250 parts by weight of toluene. The stirred mixture is now treated with a solution of 42 parts of sodium hydroxide in 200 parts of water. The mixture is kept hot and stirred for an hour. The organic layer is taken off and washed three times with water containing a little methanol. The washed material is heated and stripped under reduced pressure. The stripped oil is crystallized from heptane, giving 212 parts of a light yellow powder, corresponding in composition to

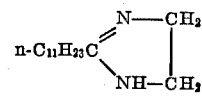

There is also obtained 11 parts of a dark oil.

PREPARATION B

In a similar way there are reacted 86 parts of technical capric acid and 60 parts of 77% ethylenediamine. The product is crystallized from a mixture of heptane and benzene, yielding 75 parts of a tan powder in the form of fine platelets, corresponding in composition to

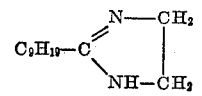

PREPARATION C

By the same procedure there are reacted 136 parts of oleic acid and 60 parts of 77% ethylenediamine. The product is a light amber solid. On recrystallization from hexane at —20° C. it yields 129 parts of a yellow waxy solid which corresponds by analysis to

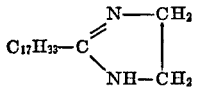

The nitrogen analysis is 9.2% (9.14% theory).

PREPARATION D

In a similar manner 147.5 parts of refined tall oil (0.5 mole) is reacted with 60 parts of ethylenediamine. The product is a dark oil containing 6.0% of nitrogen in a yield of 167.3 parts. The product is actually a mixture of substances of the formula

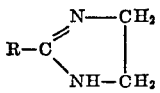

where R is a long-chained aliphatic group and/or the residue from rosin acids.

In the same way there may be reacted long-chained acids and propylenediamine to give products of the structure

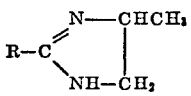

or with butylenediamine to give the 4,5-dimethyl homologues.

PREPARATION E

To a cooled mixture of 67 parts of 85% propylenediamine, 53 parts of concentrated hydrochloric acid, and 86 parts of toluene (solvent) there is added 100 parts of lauric acid. This mixture is heated and stirred under reflux in an atmosphere of nitrogen while the water of reaction is collected in a trap. After 77 parts of water layer are collected, the toluene is distilled out and the reaction mixture heated to 267–337° C. for 25 minutes.

To the cooled mixture there are added 215 parts of toluene and 221 parts of 9.5% sodium hydroxide solution. The liberated imidazoline is now washed twice with portions of hot water. The toluene and water are removed in vacuo on a steam bath to obtain 118.6 parts of amber oil which has a nitrogen content of 11.3% (theory 11.8). This product is 2-undecyl-4-methyl-2-imidazoline.

The lower acrylates are those from methyl to butyl acrylate. The methyl and ethyl acrylates are usually preferred since only a small alcohol group is then present to be split out.

Typical procedures for reacting the 2-substituted imidazolines with an acrylic ester to form 1-carbalkoxyethyl-2-substituted imidazolines are described in the following illustrative examples, wherein parts, as above, are by weight.

Example 1

There are mixed in a reaction vessel equipped with stirrer, condenser, and inlet tubes 151 parts of 2-heptadecylimidazoline and 47 parts of methyl acrylate. The mixture is stirred and heated. At 93° C. the mixture begins to reflux. On heating to 107° C. the mixture becomes clear. After 1.5 hours at 102°–107° C. pressure is reduced to 40 mm. and unreacted methyl acrylate is taken off and 3.8 parts theerof recovered in a trap cooled with Dry Ice. The reaction product is cooled to 80° C. and a solution of 22 parts of sodium hydroxide in 50 parts of water and 100 parts of isopropyl alcohol is added. The resulting mixture is heated at 83°–84° C., cooled to 50° C., and treated with 4.7 parts of sulfuric acid. The resulting product is heated under reduced pressure to give 196 parts of a light-tan powder. This material is primarily the sodium salt of 2-heptadecyl-1-carboxyethyl imidazoline,

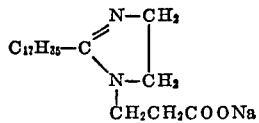

It is soluble in hot water. The solutions are clear and give considerable foam. The foam is not depressed and the solution does not become turbid when acid is added and the solution then has a pH value of two.

Repetition of the above procedure with the 2-heptadecyl-4- or 5-methylimidazoline gives a product with the same properties. When hydrochloric acid is added to the product it is converted to the form

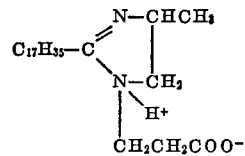

and then to the salt

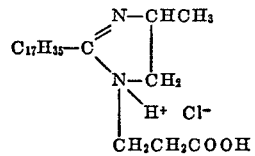

Example 2

In the same way there are reacted 112 parts of 2-undecyl imidazoline and excess methyl acrylate. The final product is a dry powder in a weight of 170 parts. It is chiefly the sodium salt of 2-undecyl-1-carboxyethyl imidazoline. It is easily soluble in cold water. Its solutions have low surface tension and give copious foam. The solutions remain clear when converted with acid first to the zwitter-ion form and then to the acid salt

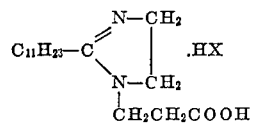

This compound gives a clear solution in synthetic hard water having 20 grain hardness.

Example 3

In like manner 2-nonyl imidazoline is reacted with methyl acrylate. The excess of this acrylate is distilled off and the 2-nonyl-1-carbomethoxyethyl imidazoline is heated with caustic soda solution to form the sodium salt of 2-nonyl-3-carboxyethyl imidazoline. An additional step is advantageously used in this preparation. After neutralization of the sodium hydroxide-treated product with a little sulfuric acid, the product is triturated with about 300 parts of acetone to remove free capric acid. The final product is a light yellow powder in an amount of 75 parts. It is readily soluble in water and remains solube in the presence of acid, alkali, or calcium salts.

In the place of methyl acrylate ethyl acrylate is used with the same procedural steps. The product is identical with that made with methyl acrylate.

Example 4

There are mixed 89 parts of 2-heptadecenyl imidazoline and 29 parts of methyl acrylate. The mixture is heated to refluxing temperatures up to 106° C. Unreacted methyl acrylate is taken off under reduced pressure. Saponification is effected as above with caustic soda solution. There is obtained a light yellow waxy solid in a yield of 115 parts. It is soluble in water, in hydrochloric acid solutions, and in solutions of sodium carbonate, sodium metasilicate, and other builders. It is soluble in 300 p. p. m. hard water. The solutions give excellent foams. The first compound formed is

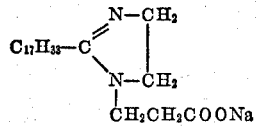

Repetition of this preparation with butyl acrylate in the place of methyl acrylate premits a higher reaction temperature. The product is identical with that prepared above. It can also be converted to its acid form, where Na is replaced with H, and to the amine salt form.

*Example 5*

The imidazoline from Preparation D, that from tall oil acids, is reacted with excess of methyl acrylate in the same way. The excess acrylate is taken off under low pressure. The resulting carbomethoxyethyl imidazoline is saponified with sodium hydroxide as above. The resulting product is taken up in 550 parts of water and 220 parts of isopropyl alcohol. This solution is thrice extracted with 160 part portions of heptane. From the heptane extract there is obtained on evaporation 10 parts of a dark oil. The solution is evaporated under reduced pressure to yield 38 parts of a dark brown, glassy solid which readily dissolves in water to give clear surface-active, foaming solutions.

*Example 6*

To 58 parts of 2-undecyl-2-imidazoline in a 3-necked flask equipped with a stirrer, nitrogen inlet, reflux condenser, and dropping funnel, there is added 18 parts of β-propiolactone in 54 minutes at 143°–155° C. After the reaction has been stirred for 20 minutes at 140° C., a sample of the reaction mixture is clear in water.

The product is purified by extracting oil impurities with heptane and removing solvents in vacuo on a steam bath. There is obtained 67 parts of 1-β-carboxyethyl-2-undecyl-2-imidazoline, which has a nitrogen content of 9.2% (theory 9.45).

The advantage of this procedure is that it yields directly the free acid form without introduction of salts. This acid form may be represented for purposes of simplification

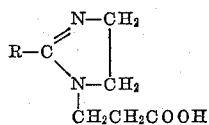

where R is the hydrocarbon group from a monocarboxylic acid.

*Example 7*

To a 3-necked flask equiped with a stirrer, thermometer, and a reflux condenser there are charged 34.8 parts of 2-undecyl-2-imidazoline and 9 parts of acrylonitrile. This mixture is heated for 70 minutes at 93–100° C. to complete the reaction. The slight excess of acrylonitrile is removed in a 25 mm. vacuum by heating to 110° C. The resulting intermediate is hydrolyzed by refluxing and stirring for 10 hours at 84°–86° C. with a solution of 6.8 parts of sodium hydroxide in 20 parts of water and 35 parts of isopropanol. The product is purified by triturating it with 2 volumes of acetone and air-drying at 55° C. There is obtained 44.8 parts of yellow solid which has a nitrogen content of 7.7% (theory 8.8) and which is chiefly the sodium salt of 1-β-carboxyethyl-2-undecyl-2-imidazoline.

This example illustrates how the carboxyethyl imidiazolines may be prepared from acrylonitrile as a starting material which is in general equivalent to an alkyl acrylate. The intermediate which is formed is a cyanoethyl imidazoline, which is hydrolyzed to the carboxyethyl derivative, in a manner comparable to saponification of the ester group to give the carboxyethyl derivative.

*Example 8*

A mixture of 71.4 parts of 2-undecyl-4-methyl-2-imidazoline and 28.7 parts of methyl acrylate heated and stirred for 1.7 hours at 95°–105° C. and 0.3 hour at 95°–170° C. The slight excess of methyl acrylate is removed in a 32 mm. vacuum at 95° C. There is formed 1 - carbomethoxyethyl - 2 - undecenyl - 4 - methyl - 2-imidazoline.

This ester is hydrolyzed by refluxing for 2.3 hours at 83°–84° C. with 13.2 g. sodium hydroxide dissolved in 30 parts of water and 62 parts of isopropanol. The solution is neutralized with 3.0 parts of 50% H₂SO₄, extracted with heptane to remove oily impurities, and stripped in vacuo to remove solvents. There is obtained 98.7 parts of tan powder which corresponds in composition to the sodium salt of 1 - β - carboxyethyl-2-undecyl-4-methyl-2-imidazoline.

As was noted above, the compounds of this invention may be mixed with quaternary ammonium compounds. When a surface active quaternary ammonium salt is used which is bacteriostatic or bactericidal, these activities are often increased. Typical quaternary salts include dodecyltrimethylammonium chloride, dodecyldimethylbenzylammonium chloride, cetylpyridinium bromide, octylphenoxyethyldimethylbenzylammonium chloride, dodecylbenzyltrimethylammonium chloride, etc.

When the weight ratio of 2-hydrocarbon substituted imidazoline propionate to quaternary ammonium compound is from about 1:1 to about 1:5, the quaternary is activated. The most marked and useful ratios are 1:1 to 1:2.

Tests were made with a solution of octylphenoxyethoxyethyldimethylbenzylammonium chloride at 50 p. p. m. in distilled water against *Escherichia coli*. Survival of organism was determined over a range of time starting with a suspension of 25,400,000 bacteria per ml. The solution of this quaternary salt alone required about one minute for significant kill of bacteria, the survival then being 0.0133%. At five minutes zero survival was found.

A solution having 50 parts per million of the above quaternary and 50 p. p. m. of the sodium salt of 2-undecyl-1-β-carboxyethylimidazoline showed 0.001% survival at 15 seconds and zero survival at 30 seconds and longer. An identical result was obtained at 100 p. p. m. of the above quaternary and 50 p. p. m. of the same imidazoline compound.

Similar activating or synergistic effects are obtained with other compounds of this invention in place of the above 2-undecyl substituted compound. Likewise, the quaternary ammonium salt reported upon in detail above may be replaced with any other surface active, bactericidal quaternary salt.

The compounds of this invention, as has been shown above, may take any one of three forms. The form may be that of a carboxylate,

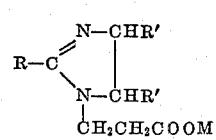

where M is an equivalent of a metal cation, particularly of an alkali or alkaline earth metal. It may also be a quaternary ammonium group. The acid form of the compounds is conveniently represented

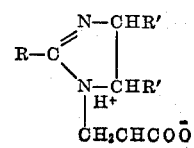

while the amine salt form is represented

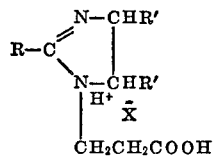
CH₂CH₂COOH

To form the latter the acid represented as HX need be stronger than the carboxylic group of the compound. Here X is used to represent an anion forming a strong inorganic acid with H, HX being symbolic of an equivalent of a strong inorganic acid.

We claim:

1. A process for preparing an ester of the structure

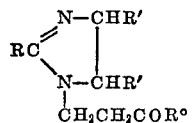
CH₂CH₂COR° in which R° is a lower alkyl group from methyl to butyl, which comprises reacting by addition, without the benefit of added catalyst and at a temperature between 75° and 150° C., an alkyl acrylate in which the alkyl group has from 1 to 4 carbon atoms and an imidazoline, in dry powder form, of the formula

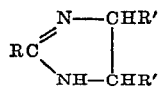

the R in both formulae being a hydrocarbon group of 9 to about 17 carbon atoms and the R' in both formulae being a member of the class consisting of hydrogen and the methyl group.

2. A process for preparing an ester of the structure

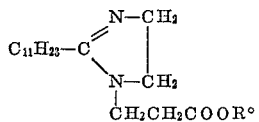
CH₂CH₂COOR° in which R° is a lower alkyl group from methyl to butyl, which comprises reacting by addition, without the benefit of added catalyst and at a temperature of between 75° and 150° C., an alkyl acrylate in which the alkyl group has from 1 to 4 carbon atoms and 2-undecyl imidazoline in dry powder form.

3. A process for preparing an ester of the structure

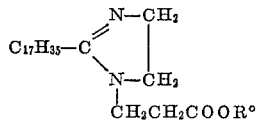
CH₂CH₂COOR° in which R° is a lower alkyl group from methyl to butyl, which comprises reaction by addition, without the benefit of added catalyst and at a temperature of between 75° and 150° C., an alkyl acrylate in which the alkyl group has from 1 to 4 carbon atoms and 2-heptadecyl imidazoline in dry powder form.

4. A process for preparing an ester of the structure

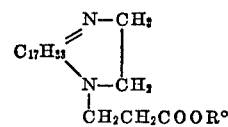
CH₂CH₂COOR° in which R° is a lower alkyl group from methyl to butyl, which comprises reacting by addition, without the benefit of added catalyst and at a temperature of between 75° and 150° C., an alkyl acrylate in which the alkyl group has from 1 to 4 carbon atoms and 2-heptadecenyl imidazoline in dry powder form.

5. A process for preparing an ester of the structure

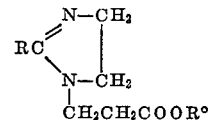
CH₂CH₂COOR° in which R° is a lower alkyl group from methyl to butyl, which comprises reacting by addition, without the benefit of added catalyst and at a temperature of between 75° to 150° C., an alkyl acrylate in which the alkyl group has from 1 to 4 carbon atoms and the dry powder form of

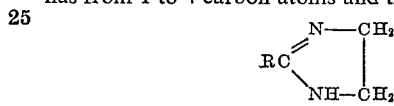

the R in both formulae being the residue of tall oil acids.

6. The process for preparing an ester of the structure

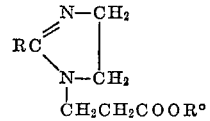
CH₂CH₂COOR° in which R° is a lower alkyl group from methyl to butyl, which comprises reacting by addition, without the benefit of added catalyst and at a temperature of between 75° and 150° C., an alkyl acrylate in which the alkyl group has between 1 to 4 carbon atoms and the dry powder form of an imidazoline of the formula

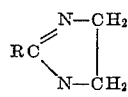

the R in both formulae being a hydrocarbon residue of 9 to 18 carbon atoms from a monocarboxylic acid.

References Cited in the file of this patent

UNITED STATES PATENTS

| | | |
|---|---|---|
| 2,199,780 | Chwala et al. | May 7, 1940 |
| 2,468,012 | Isbell | Apr. 19, 1949 |
| 2,528,378 | Mannheimer | Oct. 31, 1950 |
| 2,540,171 | Kiff | Feb. 6, 1951 |

OTHER REFERENCES

Adams et al.: "Org. Reactions," vol. V, pp. 116–119 (1949).

UNITED STATES PATENT OFFICE
Certificate of Correction

Patent No. 2,820,043 January 14, 1958

James L. Rainey et al.

It is hereby certified that error appears in the printed specification of the above numbered patent requiring correction and that the said Letters Patent should read as corrected below.

Column 7, lines 16 to 20 inclusive, claim 1, the formula should appear as shown below instead of as in the patent:

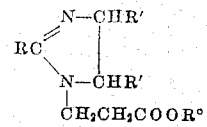

Signed and sealed this 18th day of March 1958.

[SEAL]

Attest:
KARL H. AXLINE,
*Attesting Officer.*

ROBERT C. WATSON,
*Commissioner of Patents.*

UNITED STATES PATENT OFFICE
Certificate of Correction

Patent No. 2,820,043            January 14, 1958

James L. Rainey et al.

It is hereby certified that error appears in the printed specification of the above numbered patent requiring correction and that the said Letters Patent should read as corrected below.

Column 7, lines 16 to 20 inclusive, claim 1, the formula should appear as shown below instead of as in the patent:

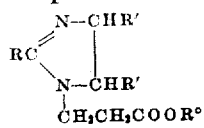

Signed and sealed this 18th day of March 1958.

[SEAL]

Attest:
KARL H. AXLINE,
*Attesting Officer.*

ROBERT C. WATSON,
*Commissioner of Patents.*